United States Patent
Hsu et al.

(10) Patent No.: US 7,487,171 B2
(45) Date of Patent: Feb. 3, 2009

(54) SYSTEM AND METHOD FOR MANAGING A HIERARCHY OF DATABASES

(75) Inventors: Windsor Wee Sun Hsu, San Jose, CA (US); Honesty Cheng Young, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 11/323,407

(22) Filed: Dec. 30, 2005

(65) Prior Publication Data

US 2007/0156790 A1    Jul. 5, 2007

(51) Int. Cl.
G06F 17/30     (2006.01)

(52) U.S. Cl. ............................. 707/101; 707/1; 707/10; 707/100

(58) Field of Classification Search ................ 707/1–3, 707/100–104, 204
See application file for complete search history.

(56) References Cited

U.S. PATENT DOCUMENTS

| | | | |
|---|---|---|---|
| 5,499,371 A | 3/1996 | Henninger et al. | |
| 6,381,731 B1* | 4/2002 | Grodd | 716/7 |
| 6,742,001 B2 | 5/2004 | Ripley | |
| 6,836,776 B2 | 12/2004 | Schreiber | |
| 7,287,048 B2* | 10/2007 | Bourbonnais et al. | 707/204 |
| 2004/0098566 A1* | 5/2004 | Farrell et al. | 712/214 |
| 2006/0036618 A1* | 2/2006 | Shuma et al. | 707/100 |

FOREIGN PATENT DOCUMENTS

WO    WO 99/52047    10/1999

OTHER PUBLICATIONS

W. B. Harding et al., "Object storage hierarchy management", IBM Systems Journal, vol. 29, No. 3, 1990, pp. 384-397.
Jim Lee, "Database Archiving Complements Faster Backup", Information Mgmt. & Tech., vol. 38, No. 4, , Oct.-Dec. 2005, Cimtech, UK. pp. 183-184.
C. Mohan, "A Survey of DBMS Research Issues in Supporting Very Large Tables", Lecture notes in computer science, Springer Verlag, Berlin, DE, vol. 730, Oct. 15, 1993, pp. 279-300.
D. Simpson, "Database archiving saves space, increases performance", Infostor, (online) Sep. 2002, pp. 1-2 retrieved from the internet: URL: http://www.infostor.com/article/article_display.cfm?Section=ARCHI&C=Newst&ARTICLE_ID=154755 &KEYWORDS=archiving&p=23.

(Continued)

*Primary Examiner*—Cam-Linh Nguyen
(74) *Attorney, Agent, or Firm*—Kenneth L. Sherman, Esq.; Michael Zarrabian, Esq.; Myers Dawes Andras & Sherman, LLP (57) ABSTRACT

A method for managing data is provided which includes monitoring an activity profile for a given row of a database and determining a target database for a given row based on the activity profile of the given row. The method further includes identifying any row related to the given row and moving the given row and any row related to the given row into the target database while preserving referential integrity.

27 Claims, 9 Drawing Sheets

OTHER PUBLICATIONS

Anonymous, "Promote on Access", IBM Technical Disclosure Bulletin, IBM Corp. New York, US., vol. 39, No. 4, Apr. 1, 1996, pp. 73-76.

W. Cheung et al., "The Model-Assisted Global Query System for Multiple Databases in Distributed Enterprises", ACM Trans. on Inf. Systems, vol. 14, No. 4, Oct. 1996, pp. 421-470.

R. V. Renesse et al., "Astrolabe: A Robust and Scalable Technology for Distributed System Monitoring, Management, and Data Mining", ACM Trans. on Computer Systems, vol. 21, No. 2, May 2003, pp. 164-206.

C. Turker et al., "Semantic integrity supportin SQL: 1999 and commercial (object-) relational database management systems", The VLDB Journal, vol. 10, 201, pp. 241-269.

Guy M. Lohman et al., "Extensions to Starburst: Objects, Types, Functions, and Rules", Communications of the ACM, vol. 34, No. 10, Oct. 1991, pp. 94-109.

\* cited by examiner

| Original Query | Rewritten Query |
|---|---|
| SELECT $t_x.f_i, \ldots t_x.f_j, \ldots t_y.f_k$ FROM $t_x \ldots t_y$ WHERE $c$ | SELECT $t_x.f_i, \ldots t_x.f_j, t_x.counter, \ldots t_y.f_k, t_y.counter$ FROM $t_x \ldots t_y$ WHERE $c$<br>UPDATE $t_x$ SET $counter = F(counter)$ WHERE $c$<br>$\ldots$<br>UPDATE $t_y$ SET $counter = F(counter)$ WHERE $c$ |
| SELECT SUM($t_x.f_i$), FROM $t_x$ WHERE $c$ GROUP BY $t_x.f_j$ | SELECT SUM($t_x.f_i$), FROM $t_x$ WHERE $c$ GROUP BY $t_x.f_j$<br>SELECT $counter$ FROM $t_x$ WHERE $c$<br>UPDATE $t_x$ SET $counter = F(counter)$ WHERE $c$ |
| UPDATE $t_x$ SET $f_i = a_i, \ldots f_j = a_j$ WHERE $c$ | SELECT $counter$ FROM $t_x$ WHERE $c$<br>UPDATE $t_x$ SET $f_i = a_i, \ldots f_j = a_j, counter = F(counter)$ WHERE $c$ |

FIG. 2A

| Original Query | Rewritten Query |
|---|---|
| SELECT $t_x.f_i, \ldots t_x.f_j, \ldots t_y.f_k$ FROM $t_x \ldots t_y$ WHERE $c$ | SELECT $t_x.f_i, \ldots t_x.f_j, t_x.identity, \ldots t_y.f_k, t_y.identity$ FROM $t_x \ldots t_y$ WHERE $c$<br>Insert into activity log ($t_x.identity, \ldots t_y.identity$) |
| SELECT SUM($t_x.f_i$), FROM $t_x$ WHERE $c$ GROUP BY $t_x.f_j$ | SELECT SUM($t_x.f_i$), FROM $t_x$ WHERE $c$ GROUP BY $t_x.f_j$<br>SELECT *identity* FROM $t_x$ WHERE $c$<br>Insert into activity log (*identity*) |
| UPDATE $t_x$ SET $f_i = a_i, \ldots f_j = a_j$ WHERE $c$ | UPDATE $t_x$ SET $f_i = a_i, \ldots f_j = a_j$ WHERE $c$<br>SELECT identity FROM $t_x$ WHERE $c$<br>Insert into activity log (*identity*) |

SYSTEM AND METHOD FOR MANAGING A HIERARCHY OF DATABASES

FIELD OF THE INVENTION

The present invention generally relates to managing data, and more specifically, this invention pertains to a system and method for managing a hierarchy of databases.

BACKGROUND

In today's information-driven society, organizations are collecting and accumulating more data than ever before. Databases are growing and within a couple of years, the world's largest database is likely to be several petabytes in size. As databases grow in size, their performance generally degrades. Their availability is also often reduced because disaster recovery and routine maintenance tasks (e.g., backup, reorganization), some of which may require the databases to be taken offline, take much longer. Moreover, although computer technology has improved dramatically to enable ever larger databases, the cost and complexity of managing such databases have not kept pace so that the task of managing the databases is increasingly taxing on the already stretched information technology staff and budget.

In practice, the data stored in the databases typically have different activity profiles and value to the organization. If each piece of data were to be managed in accordance with its activity profile and value to the organization, the cost and complexity of managing the data would be significantly reduced.

In view of the foregoing, there is a need for a more efficient and intelligent method of managing database data, including archiving and retrieving data.

SUMMARY

A method for intelligently and powerfully managing database data, including archiving and retrieving the data, is provided. It should be appreciated that the present invention can be implemented in numerous ways, such as a process, an apparatus, a system, a device or a method on a computer readable medium. Several inventive embodiments of the present invention are described below.

In one embodiment, a method for managing data is provided which includes monitoring an activity profile for a given row of a database and determining a target database for a given row based on the activity profile of the given row. The method further includes identifying any row related to the given row and moving the given row and any row related to the given row into the target database while preserving referential integrity.

In another embodiment, a computer readable media having program instructions for managing data is provided where the computer readable media includes program instructions for monitoring an activity profile for a given row of a database and program instructions for determining a target database for a given row based on the activity profile of the given row. The computer readable media further includes program instructions for identifying any row related to the given row and program instructions for moving the given row and any row related to the given row into the target database while preserving referential integrity.

In yet another embodiment, a system for managing data is provided which includes means for monitoring an activity profile for a given row of a database and means for determining a target database for a given row based on the activity profile of the given row. The system further includes means for identifying any row related to the given row and means for moving the given row and any row related to the given row into the target database while preserving referential integrity.

In another embodiment, a system for managing data is provided which includes a query rewriter configured to intercept a query regarding a database row and to rewrite the query to log an activity of the database row. The system further includes an activity store configured to store the logged activity of the database row and an activity monitor configured to monitor the activity of the database row and to determine a target database for the database row depending on the activity. The system also includes a relationship tracker configured to identify any related database row and an archive manager configured to move the database row and any related database row to the target database while maintaining referential integrity between the database row and any related database row.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

An invention is provided for intelligently and powerfully managing database data, including archiving and retrieving the data. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Embodiments of the present invention effectively determine the profile of activity for a piece of data, and manages the piece of data in a database that is appropriate for its activity profile. In general terms, embodiments of the present invention include: (1) monitoring the activity for a piece of data such as a database row; (2) determining the most appropriate database to manage the monitored row given the observed activity; and (3) moving the row into the determined most appropriate database if the row is not currently there, the movement of the row including relocating or replicating related rows such that referential integrity relationships are preserved.

Figure 1A:
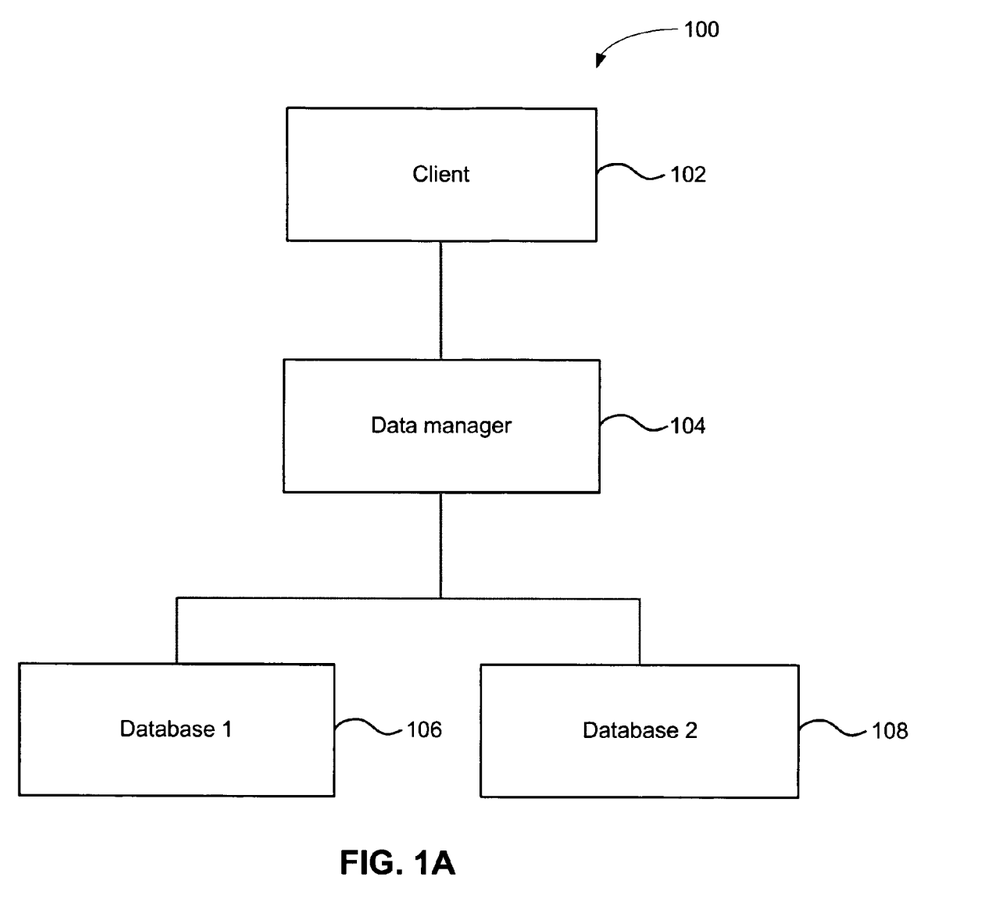
FIG. 1A shows a block diagram depicting an information management system in accordance with one embodiment of the present invention.

FIG. 1A shows a block diagram depicting an information management system 100 in accordance with one embodiment of the present invention. It should be appreciated that the blocks in the block diagram described herein may represent hardware and/or software and it should be further appreciated that any suitable system that can implement the methodology described herein may be utilized. In one embodiment, the system 100 includes a client 102 that is connected to a data manager 104 which in turn is connected to a database-1 106 and a database-2 108. It should be appreciated that the client 102 is exemplary and that any suitable numbers and/or types of clients may be included in the system 100. In one embodiment, the client 102 may be a computer where a user may input a query into a database. The data manager 104 is described in further detail in reference to FIG. 1B. In one embodiment, the database-1 106 and the database-2 108 are parts of a hierarchy of databases where certain databases include data that are more likely to be accessed soon as compared to other databases within the hierarchy which may include data that are less likely to be accessed in the near future. In one embodiment, the databases within the hierarchy of databases may be managed by different database management systems (DBMS) such as, for example, DB2 by IBM Corp., SQL Server by Microsoft Corp or Oracle Database by Oracle Corp.

Figure 1B:
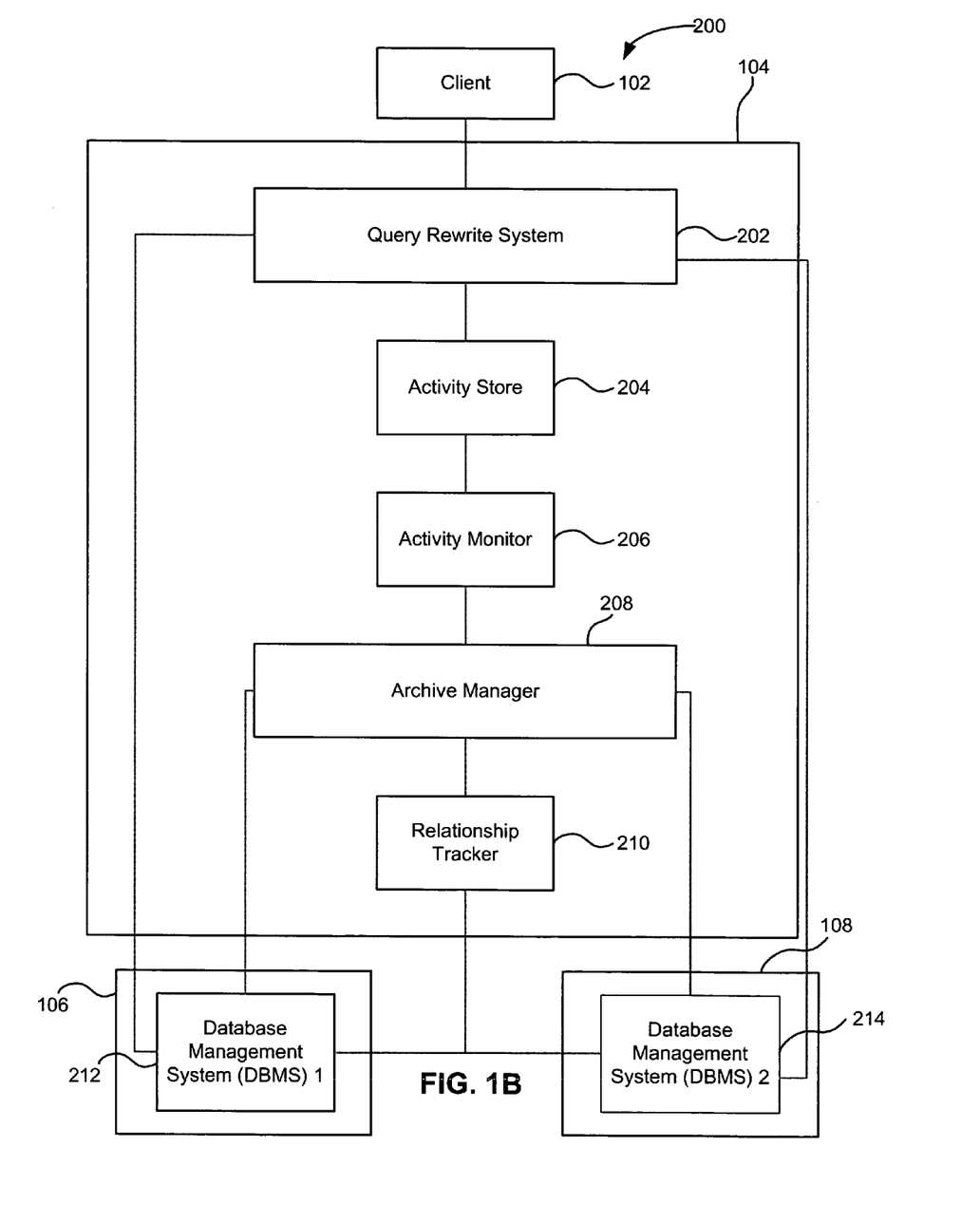
FIG. 1B illustrates an information management system which shows a detailed view of the data manager in accordance with one embodiment of the present invention.

FIG. 1B illustrates an information management system 200 which shows a detailed view of the data manager 104 in accordance with one embodiment of the present invention. In one embodiment, the system 200 includes a client 102 as described in FIG. 1A which is connected to the data manager 104 which includes a query rewrite system 202 (also known as query rewriter), an activity store 204, an activity monitor 206, an archive manager 208, and a relationship tracker 210. In one embodiment, the query rewrite system 202 may communicate with the activity store 204 which in turn may communicate with the activity monitor 206. The activity monitor 206 may communicate with the archive manager 208, and the archive manager 208 may communicate with the relationship tracker 210, a database management system-1 212 within the database-1 106, and a database management system-2 214 within the database-2 108. The relationship tracker 210 may communicate with one or both of the database management system-1 212 and the database management system-2 214. It should be appreciated that two database management systems 210 and 212 are shown for exemplary purposes only, and one skilled in the art should appreciate that the present invention may operate with any suitable number of database management systems depending on the configuration and/or complexity of the database system(s) being managed.

In one embodiment, the client 102 may send a database query directed to a particular database. In one embodiment, the query rewrite system 202 may receive or intercept the database query from the client 102 and analyze the query. The query rewrite system 202 may then rewrite the query so activities related to certain row(s) of a database may be logged. Exemplary embodiments of how queries may be rewritten are discussed in further detail in reference to FIGS. 2A and 2B. The rewritten query may then be communicated to the target database and the access data recorded by the rewritten query are communicated to and stored at activity store 204. The activity monitor 206 may monitor the activities of the rows in the database and determine which rows of the database should be moved depending on the activity profile. In one embodiment, within the hierarchy of databases, there may be certain databases designated to have data which are more likely to be accessed in the near future and databases designated to have data which are less likely to be accessed soon. In one embodiment, the likelihood for a piece of data to be accessed in the near future is determined based on the activity profile. In the simplified exemplary embodiment as shown in FIG. 1B, the database hierarchy may include the database management system-1 212 and the database management system-2 214.

The determination made by the activity monitor 206 is sent to the archive manager 208 which manages the archiving of the database row and any related database rows in other database(s). In one embodiment, the relationship tracker 208 tracks relationships such as referential integrity relationships among the tables in the databases being managed.

In one embodiment of the invention, the activity profile may be determined external to the DBMS so that modification of the DBMS is not necessary for practicing this invention. As discussed above, this determination, in one embodiment, is accomplished in the data manager 104. In a particular embodiment, the query rewrite system 202, activity store 204 and activity monitor 206 within the data manager 104 accomplish this task.

In one embodiment, the data manager 104 may utilize an additional column to determine the activity of rows within the database. In one exemplary embodiment, the data manager 104 may add at least one additional column to a database table to store activity counters. The activity counters show how many times a particular row within the database is accessed. The column addition can be effected with standard DBMS commands such as "Alter Table". In some cases, it may be preferable to rename the augmented table and to create a view of the table with the same name and columns as the original table. Such operations can again be carried out using standard DMBS commands. Existing indexes, referential integrity relationships and applications are not impacted by this approach. As discussed above, to update the counters, the query rewrite system 202 of the system 104 intercepts and rewrites the queries sent to the DBMS.

Figure 2A:
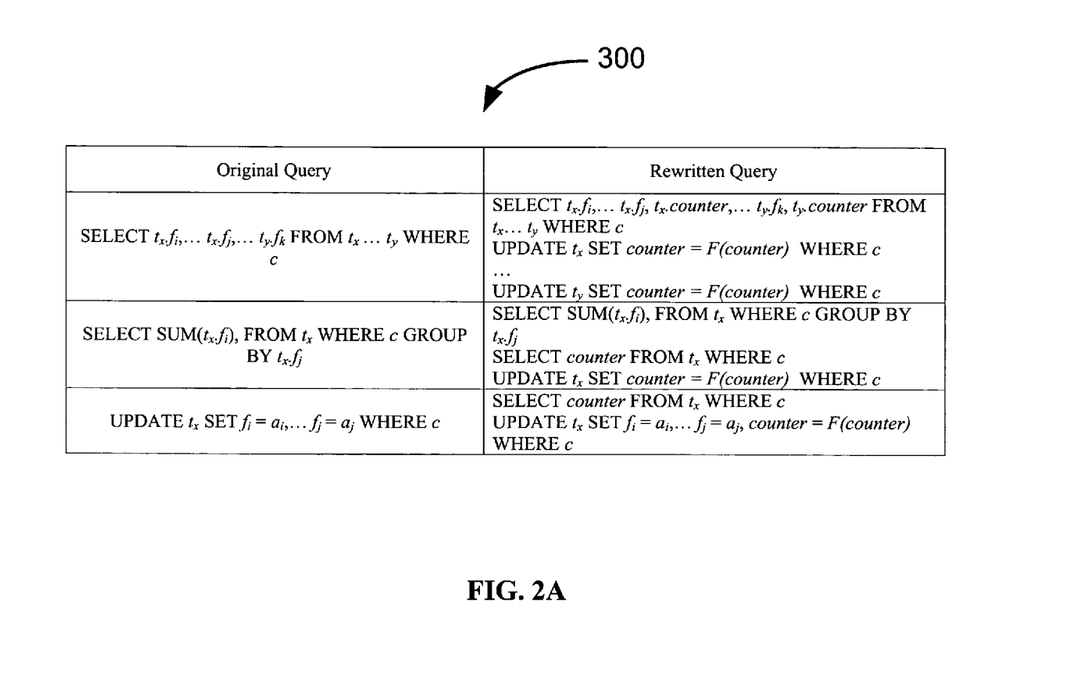
FIG. 2A lists an illustrative example of query rewrites where a column counter is utilized in accordance with one embodiment of the present invention.

FIG. 2A lists an illustrative example of query rewrites where a column counter is utilized in accordance with one embodiment of the present invention. In one embodiment, the basic idea of the query rewrite is to modify a "select" query by adding a counter column to the columns being selected and to insert an operation to update the counter column. For "update" queries, the system inserts an operation to select a counter column and adds the counter column to the columns being updated. "Insert" queries are handled by additionally providing an initial value for insertion into a counter column. In one embodiment, a default value is specified for a counter column. Therefore, in an exemplary embodiment of a rewrite process, a query may be rewritten so a counter column may be updated due to an access of a particular row by, for example, incrementing a value in the appropriate field of the counter column corresponding to the particular row. In such a way, the level of activity of the particular row may be determined. In another embodiment, the update and insert queries are not monitored by rewriting the queries but are instead reconstructed from the database log.

Figure 2B:
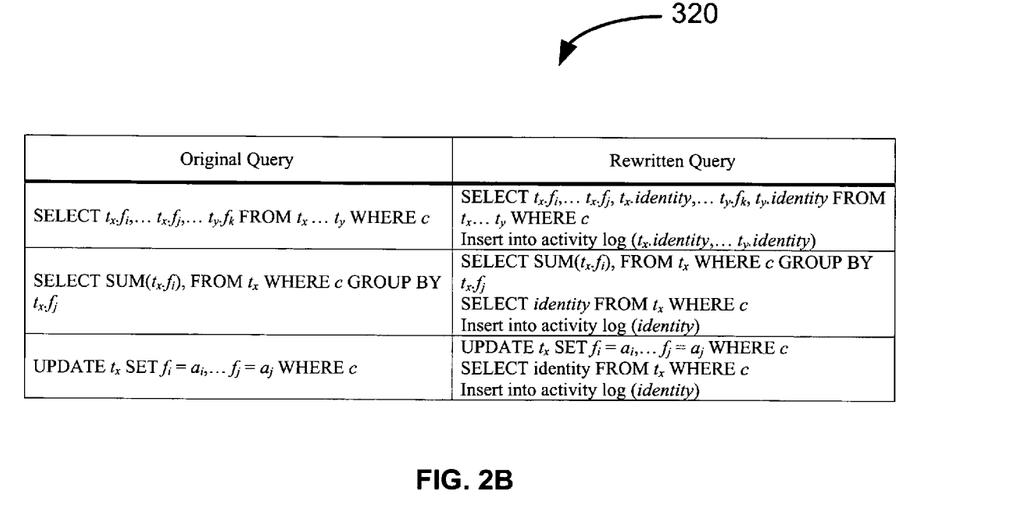
FIG. 2B illustrates further query rewrites where the system utilizes a unique ID with each database row in accordance with one embodiment of the present invention.

FIG. 2B illustrates further query rewrites where the system utilizes a unique identification (ID) with each database row in accordance with one embodiment of the present invention. In one exemplary embodiment of a rewrite process, a query may be rewritten so the system may associate a unique ID with each database row where when a row is accessed, the system may store the unique ID associated with the accessed row in an activity log. The activity log can be a file or a database table. In some DBMS (e.g., Oracle), each row in a table has a unique ID (e.g., rowID) which can be used to identify the row in the activity log. Other DBMS (e.g., DB2, SQLServer) has the ability to create an "identity" column to uniquely identify a row in a table. For such DBMS, the system creates an additional identity column in a table to be monitored. In some cases, it may be preferable to rename the augmented table and to create a view of the table with the same name and columns as the original table. Therefore, for each access of a database row, a corresponding entry may be recorded within the activity log so the activity level of the database row can be discerned by examining the activity log. As discussed earlier, such operations can be carried out using standard DMBS commands and do not affect existing indexes, referential integrity relationships and applications.

To log the activity, the system may intercept and rewrite the queries sent to the DBMS. The basic idea is to modify a "select" query by adding the identity column to the columns being selected and to store the value retrieved from the identity column in the activity log. For "update" and "insert" queries, the system inserts an operation to select the identity column and stores the value retrieved from the identity column in the activity log. In one embodiment, the update and insert operations are not monitored by modifying the queries but are instead reconstructed from the database log. In another embodiment, the activity log may be compressed such as by eliminating multiple log records pertaining to the same row within a period of time.

Periodically, the system analyzes the collected activity information to determine the activity profile of the rows. In one embodiment, a row is considered to be inactive if its associated counter value is below a threshold. In another embodiment, a row is considered to be inactive if the number of occurrences of its unique ID in the activity log is below a threshold. The system can remove the inactive rows from the active database (e.g. higher priority database) and insert them into an archive repository (i.e. target database or lower priority database). In one embodiment, the archive repository is a database with the same tables and schema as the active database. The activity of the rows in the archive database is similarly monitored and any row that is deemed to be active is promoted back to the active database. In one embodiment, a query is rewritten to run against both the active and archive database.

In one embodiment, the system may maintain multiple databases organized in a hierarchy. The system associates a target activity range with each database and stores each database in a storage system fitting its target activity range. As described earlier, the activity for each database is monitored and the collected activity information is analyzed periodically. For each row, the system determines its target database by matching its activity profile with the target activity range of the various databases. The system relocates a row to its target database if it is not currently there.

Figure 3:
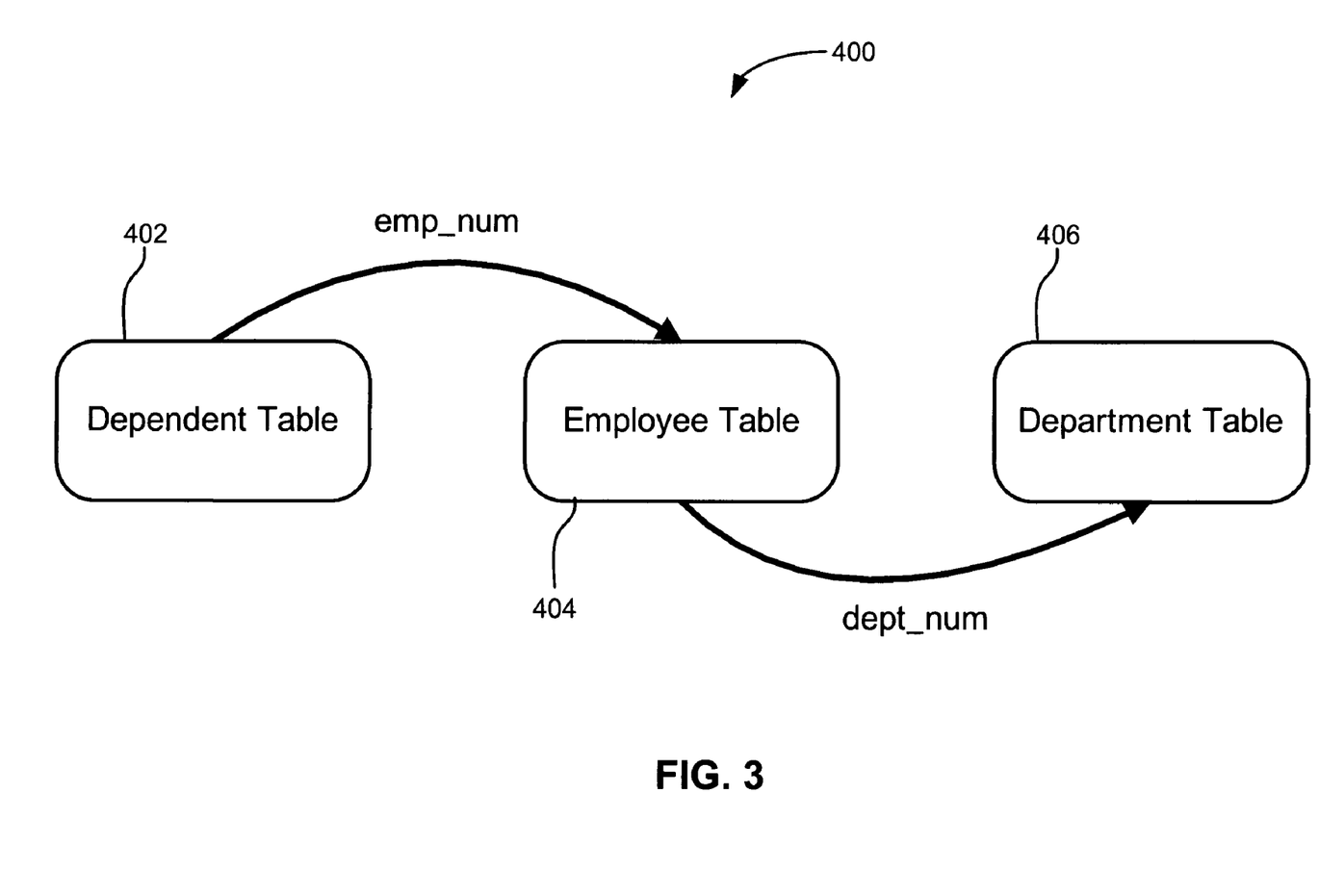
FIG. 3 depicts topologically sorted referential integrity relationships in accordance with one embodiment of the present invention.

FIG. 3 depicts topologically sorted referential integrity relationships in accordance with one embodiment of the present invention. In accordance with one embodiment of the present invention, when the system 100/200 moves/copies a row to another database, it also moves/copies the related rows so that referential integrity relationships are preserved. In one embodiment, the information management system 100/200 extracts the referential integrity relationships by analyzing the database schema to identify the primary and foreign keys and their relationships. In one embodiment, the system allows the administrator or user of the system to input referential integrity relationships, including those that are not enforced by the DBMS but by the middleware and applications above the DBMS.

Next, the system performs a topological sort on the referential integrity relationships. An example of a topologically sorted set of referential integrity relationships is shown in FIG. 3. As illustrated, the emp_num column in the dependent table 402 is a foreign key into the employee table 404 and the dept_num column in the employee table 404 is a foreign key into the department table 406. In the sorted output, a row "references" only rows to the right of it. For example, a row in the dependent table 402 references a row in the employee table 404 that has a matching value in the emp_num column. To move a target row from a source database to a target database, the system first identifies all the rows that are referentially related, directly or transitively, to the target row. If the set of related rows have the same target database, the system proceeds to copy the rows to the target database. The copying is performed in a right to left order according to the topologically sorted set of referential integrity relationships. After the rows have been copied to the target database, they may be deleted from the source database if the rows are not referentially related to another row. In one embodiment, the rows are deleted in a left to right order according to the topologically sorted set of referential integrity relationships.

In one embodiment, if the set of related rows have different target databases, the system proceeds as follows: for each target database being analyzed, the system determines the leftmost row, in the topologically sorted set of referential integrity relationships, whose target database is the target database being analyzed. For each of the target database, the system begins with the rightmost row and copies the rows in a right to left order to the target database, stopping at the respective determined leftmost row for the target database. If a target database is the source database, the copying for that database is skipped. The system determines the leftmost row, in the topologically sorted set of referential integrity relationships, whose target database is the source database. The system deletes from the source database all the rows that are to the left of the determined leftmost row if the rows are not referentially related to another row. In an embodiment, the deletion is carried out in a left to right order. In one embodiment, when an update query is received, it is rewritten to run against all the databases. It should be appreciated that in one embodiment, all of the copying/moving/deleting are completed while taking into account referential integrity constraints.

Depending on the database being archived or restored, there may be certain referential integrity constraints which may require right to left copying/moving and left to right deleting. This can occur because, for example, if the rightmost row in the topologically sorted set of referential integrity relationships is deleted first, then the row to the left of the deleted row would point to null data which would cause an error in the database. If the cascaded delete function is enabled in the database, then all the rows that point to the deleted row would be automatically deleted, which could result in loss of data. In such a case deletion would have to occur from left to right. In a similar example, with respect to copying, in one embodiment, copying would need to take place from right to left because if copying took place left to right, then the database row first copied would again point to null data which could cause an error in the database.

Figure 4:
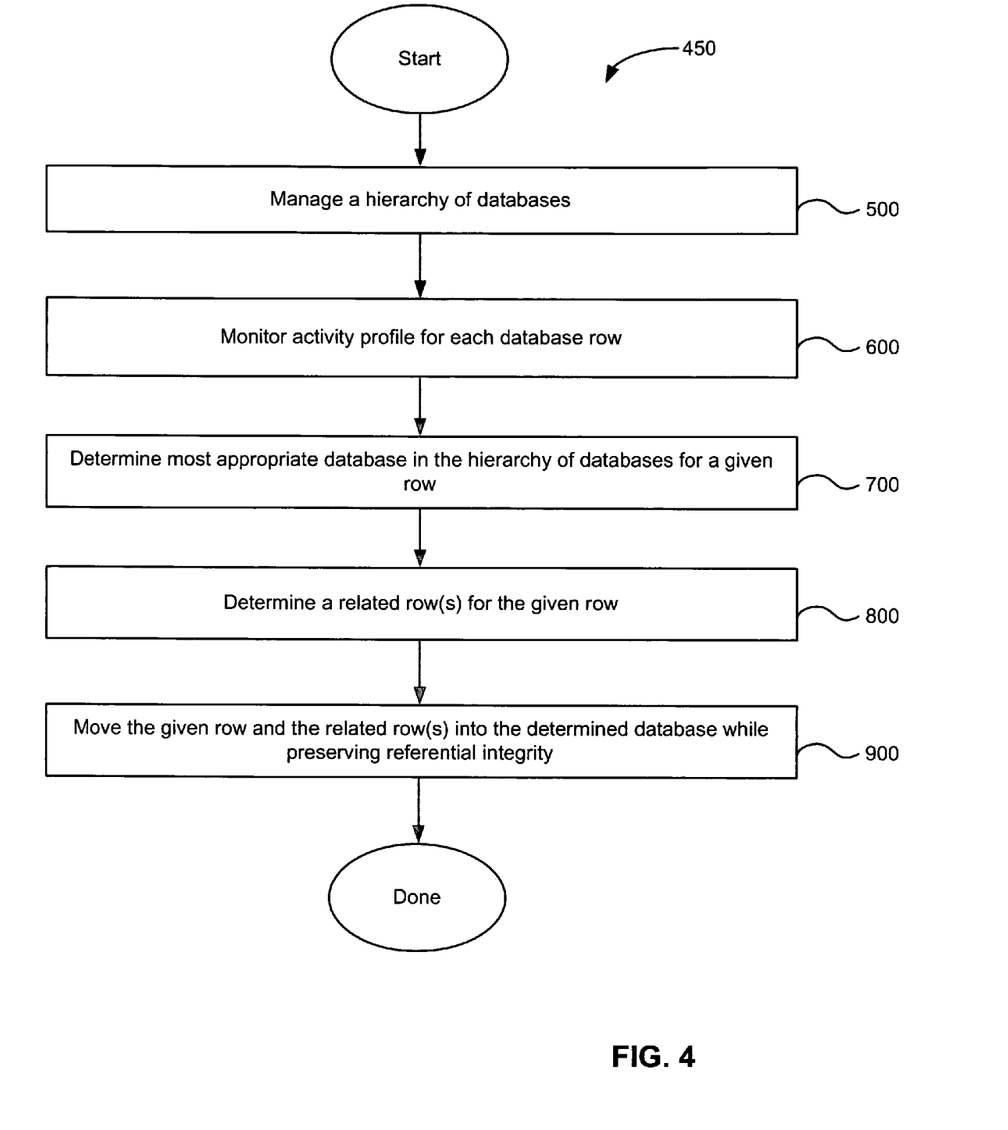
FIG. 4 shows a flowchart illustrating a method for managing database data in accordance with one embodiment of the present invention.

FIG. 4 shows a flowchart 450 illustrating a method for managing database data in accordance with one embodiment of the present invention. It should be understood that the processes depicted in the flowchart 450 and the other flowcharts herein may be in program instruction form written in any suitable computer readable media. For instance, the program instructions can be in the form of software code developed using any suitable type of programming language. For completeness, the process flow of FIG. 4 will illustrate an exemplary process whereby database row(s) may be managed in a highly efficient manner.

In one embodiment, the method begins with operation 500 where a hierarchy of databases is managed. It should be appreciated that the hierarchy of databases may include any suitable number of databases in any suitable type of configuration depending on the type of data managed and/or the budget available.

At operation 600, the method monitors an activity profile for each database row. One exemplary embodiment of operation 600 is described in further detail in reference to FIG. 5 below. Then the method moves to operation 700 where the most appropriate database in the hierarchy of databases for a given row is determined. In one embodiment, the most appropriate database is a database within the hierarchy of databases whose target activity level corresponds to the activity profile of the given row. For example, in one embodiment, if the given row has been accessed n times then the given row would be determined to be appropriately stored within a particular database (i.e. target database) that has been designated to include rows that have been accessed n times. In yet another embodiment, the target database may include rows that have been accessed a range of times such as, for example, between m and n times where m and n may be any suitable number.

In one embodiment, the database with rows that are accessed more often may be a higher priority database and the database with rows that are accessed less often may be a lower priority database. Therefore, for the sake of efficiency and cost effectiveness, the higher priority database may be contained in a type of storage that yields quick access times and/or has easier access, and the lower priority database may be contained in a type of storage that yields longer access times and/or has more difficult access. Therefore, an active database may be stored on the best types of storage while the inactive database may be stored on a lower tier storage that is not as reliable or as fast but is less expensive. As discussed herein, any suitable type of storage device may used to store the database including, for example, random access memory, cache memory, flash memory, disk drives, CDs, DVDs, storage area network, tape drives, etc. Therefore, depending on the priority of the database, the database may be contained in an appropriate level/performance storage device. One exemplary embodiment of operation 700 is described in further detail in reference to FIG. 6 below.

After operation 700, the method advances to operation 800 which determines a related row for the given row. In one embodiment, a given row may have data that refers to data within another row in the same table or another table. Such row(s) may be identified in this operation. After operation 800, the method proceeds to operation 900 which moves the given row and the related row into the determined database while preserving referential integrity. One exemplary embodiment of operation 900 is described in further detail in reference to FIG. 7 below. It should be appreciated that the moving operation may be either a retrieval (upstream) or an archival (downstream) operation depending on the activity profile of a given row.

Figure 5:
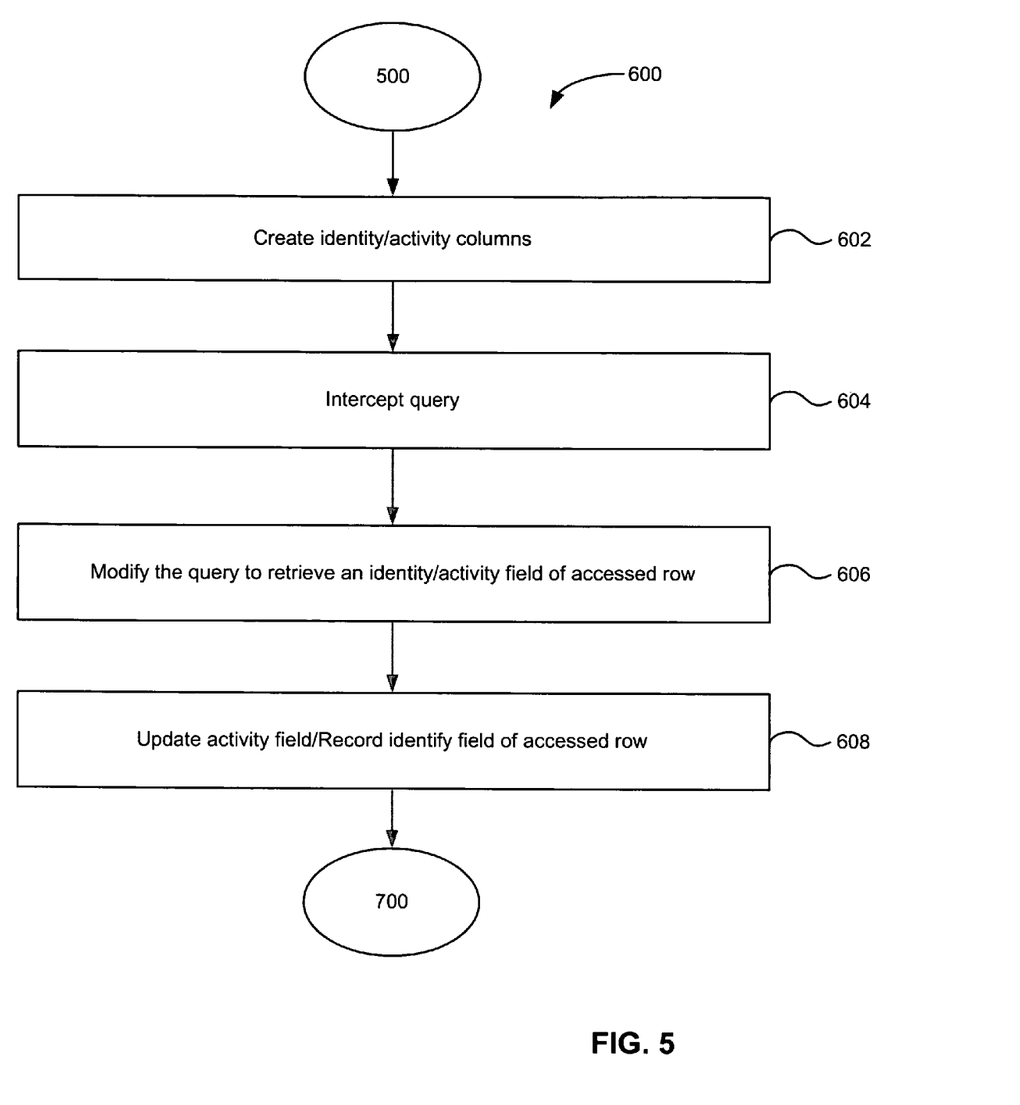
FIG. 5 shows a flowchart which defines an exemplary operation of monitoring an activity profile for each database row in accordance with one embodiment of the present invention.
Figure 6:
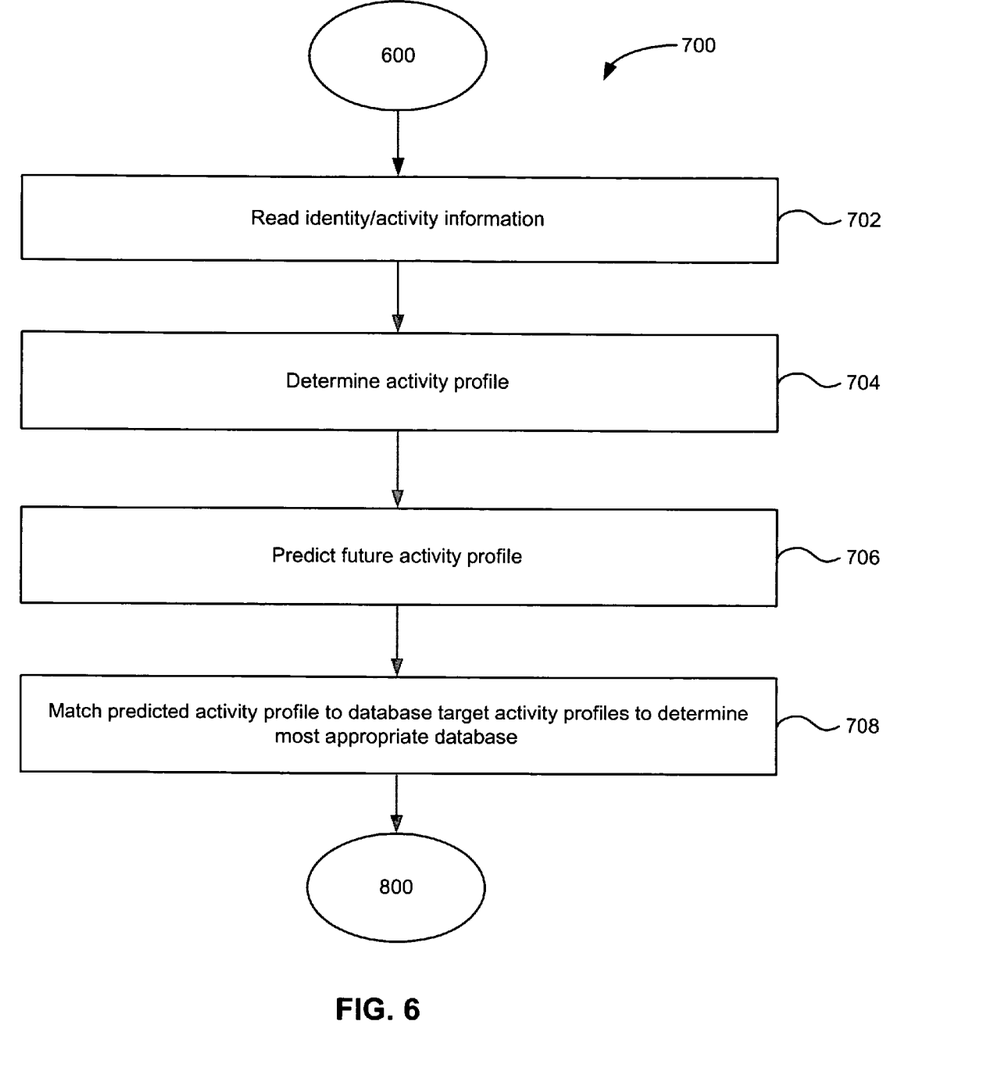
FIG. 6 illustrates a flowchart which defines an exemplary operation of determining a most appropriate database in the hierarchy of databases for a given row in accordance with one embodiment of the present invention.

FIG. 5 shows a flowchart 600 which defines an exemplary operation of monitoring an activity profile for each database row in accordance with one embodiment of the present invention. In one embodiment, the flowchart 600 begins with operation 602 which creates identity/activity columns. After operation 602, the flowchart moves to operation 604 which intercepts a query. After operation 604, the method advances to operation 606 which modifies the query to retrieve an identity field of an accessed row. In another embodiment, the query may be modified to retrieve an activity field of the accessed row. Then operation 608 records the retrieved value of the identity field in an activity log. In another embodiment, operation 608 updates the activity field to, for example, show how many times the particular row has been accessed.

FIG. 6 illustrates a flowchart 700 which defines an exemplary operation of determining a most appropriate database in the hierarchy of databases for a given row in accordance with one embodiment of the present invention. In one embodiment, the flowchart 700 begins with operation 702 where an identity/activity information is read. After operation 702, the flowchart proceeds to operation 704 where a profile of activity is determined. After operation 704, the flowchart advances to operation 706 which predicts a future activity profile. In one embodiment, future activity can be extrapolated from past activity of the row. Then operation 708 determines the database whose target activity profile most closely matches the predicted future activity profile for the given row.

Figure 7:
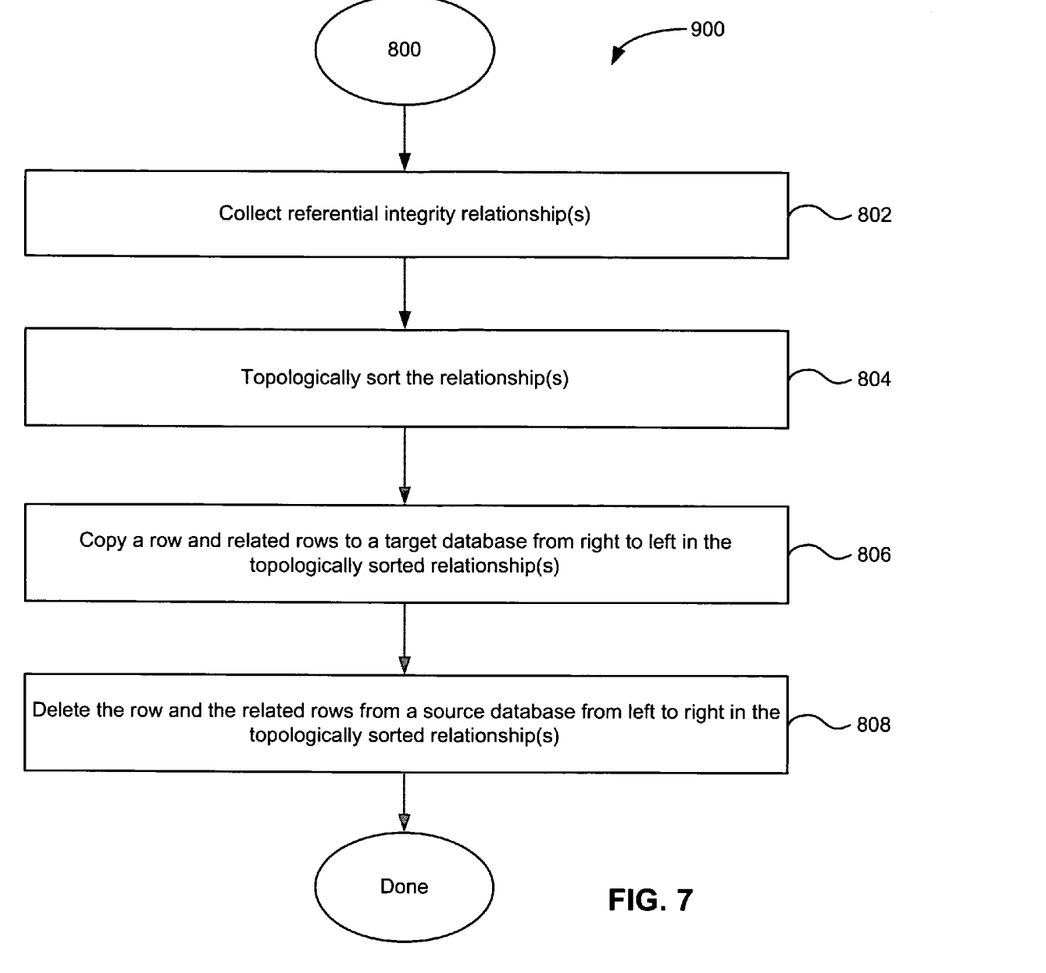
FIG. 7 shows a flowchart which defines an exemplary operation of moving the given row and the related row(s) into the determined database while preserving referential integrity in accordance with one embodiment of the present invention.

FIG. 7 shows a flowchart 900 which defines an exemplary operation of moving the given row and the related row(s) into the determined database while preserving referential integrity in accordance with one embodiment of the present invention. In one embodiment, the flowchart 900 begins with operation 802 which collects referential integrity relationship(s). After operation 802, the method proceeds to operation 804 which topologically sorts the relationship(s). Then operation 806 copies a row and related rows to a target database from right to left in the topologically sorted relationship(s). After operation 806, the flowchart moves to operation 808 which deletes the row and related rows from a source database from left to right in the topologically sorted relationship(s).

While certain embodiments of the invention have been described as largely not requiring changes to the DBMS, it should be appreciated that the invention can also be implemented by suitably modifying the DBMS. For example, the activity counter for each row can be maintained internally by the DBMS. The counter can also be maintained by the DBMS as a pseudo column containing DBMS-generated data that can be referenced in database queries like user-defined columns.

In addition, while the focus of certain embodiments has been on identifying the target database for a row based on its activity profile, it should be appreciated that the activity profile can be used in combination with other ways to determine the target database. Also, the technique of monitoring row activity can be used to facilitate other operations such as preferential caching, reorganization, etc. and that the invention can be adapted to operate on units of data other than the database row.

The invention may employ various computer-implemented operations involving data stored in computer systems. These operations are those requiring physical manipulation of physical quantities. Usually, though not necessarily, these physical quantities are capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, magnetic disks, magnetic tapes, CDs, DVDs and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for managing data, comprising:
monitoring an activity profile for a given row of a database;
determining a target database for the given row based on the activity profile of the given row;
identifying any row related to the given row; and
moving the given row and any row related to the given row into the target database while preserving referential integrity,
wherein the activity profile comprises all accesses of the given row, and moving the given row and any row related to the given row into the target database includes one of archiving the given row and any row related to the given row into a lower priority database or retrieving the given row and any row related to the given row into a higher priority database.

2. The method for managing data, as recited in claim 1, wherein the higher priority database is contained in a type of storage that yields higher performance and the lower priority database is contained in a type of storage that yields lower performance.

3. The method for managing data, as recited in claim 1, wherein the higher priority database contains rows that are more likely to be accessed than rows within the lower priority database.

4. The method for managing data, as recited in claim 1, wherein identifying any row related to the given row includes identifying at least one row having a referential integrity relationship with the given row.

5. The method for managing data, as recited in claim 1, wherein moving the given row and any row related to the given row into the target database includes copying the given row and any row related to the given row from a source database into the target database and deleting from the source database the given row and any of the related row that are not referentially related to another row.

6. The method for managing data, as recited in claim 1, wherein monitoring an activity profile includes intercepting a database query and rewriting the database query to keep count of how many times the given row has been accessed.

7. The method for managing data, as recited in claim 1, wherein monitoring an activity profile includes intercepting a database query and rewriting the database query to record the rows that are accessed by the query.

8. The method for managing data, as recited in claim 1, wherein moving the given row and any row related to the given row into the target database includes generating a topologically sorted graph of referential integrity relationships between the given row and any row related to the given row, the moving being accomplished by usage of the topologically sorted graph.

9. A computer program product comprising a computer medium having computer readable program for managing data, wherein the computer readable program when executed on a computer causes the computer to:
monitor an activity profile for a given row of a database;
determine a target database for the given row based on the activity profile of the given row;
identify any row related to the given row; and
move the given row and any row related to the given row into the target database while preserving referential integrity,
wherein the activity profile comprises all accesses of the given row, and said move the given row and any row related to the given row into the target database includes one of archiving the given row and any row related to the given row into a lower priority database or retrieving the given row and any row related to the given row into a higher priority database.

10. The computer program product as recited in claim 9, wherein the higher priority database is contained in a type of storage that yields higher performance and the lower priority database is contained in a type of storage that yields lower performance.

11. The computer program product as recited in claim 9, wherein the higher priority database contains rows that are more likely to be accessed than rows within the lower priority database.

12. The computer program product as recited in claim 9, wherein the computer readable program when executed on the computer that causes the computer to identify any row related to the given row further causes the computer to identify at least one row having a referential integrity relationship with the given row.

13. The computer program product as recited in claim 9, wherein the computer readable program when executed on the computer that causes the computer to move the given row and any row related to the given row into the target database further causes the computer to copy the given row and any row related to the given row from a source database into the target database and delete the source database the given row and any of the related row that are not referentially related to another row.

14. The computer program product as recited in claim 9, wherein the computer readable program when executed on the computer that causes the computer to monitor an activity profile further causes the computer to intercept a database query and rewrite the database query to keep count of how many times the given row has been accessed.

15. The computer program product as recited in claim 9, wherein the computer readable program when executed on the computer that causes the computer to monitor an activity profile further causes the computer to intercept a database query and rewrite the database query to record the rows that are accessed by the query.

16. The computer program product as recited in claim 9, wherein the computer readable program when executed on the computer that causes the computer to move the given row and any row related to the given row into the target database further causes the computer to generate a topologically sorted graph of referential integrity relationships between the given row and any row related to the given row, the move being accomplished by usage of the topologically sorted graph.

17. A system for managing data, comprising:
   means for monitoring an activity profile for a given row of a database;
   means for determining a target database for the given row based on the activity profile of the given row;
   means for identifying any row related to the given row; and
   means for moving the given row and any row related to the given row into the target database while preserving referential integrity,
   wherein the activity profile comprises all accesses of the given row, and the means for moving the given row and any row related to the given row into the target database includes one of archiving the given row and any row related to the given row into a lower priority database or retrieving the given row and any row related to the given row into a higher priority database.

18. The system for managing data, as recited in claim 17, wherein the higher priority database is contained in a type of storage that yields higher performance and the lower priority database is contained in a type of storage that yields lower performance.

19. The system for managing data as recited in claim 17, wherein the higher priority database contains rows that are more likely to be accessed than rows within the lower priority database.

20. The system for managing data as recited in claim 17, wherein the means for identifying any row related to the given row includes means for identifying at least one row having a referential integrity relationship with the given row.

21. The system for managing data as recited in claim 17, wherein the means for moving the given row and any row related to the given row into the target database includes means for copying the given row and any row related to the given row from a source database into the target database and deleting from the source database the given row and any of the related row that are not referentially related to another row.

22. The system for managing data as recited in claim 17, wherein the means for monitoring an activity profile includes means for intercepting a database query and rewriting the database query to keep count of how many times the given row has been accessed.

23. The system for managing data as recited in claim 17, wherein the means for monitoring an activity profile includes means for intercepting a database query and rewriting the database query to record the rows that are accessed by the query.

24. The system for managing data as recited in claim 17, wherein the means for moving the given row and any row related to the given row into the target database includes means for generating a topologically sorted graph of referential integrity relationships between the given row and any row related to the given row, the moving being accomplished by usage of the topologically sorted graph.

25. A system for managing data, comprising:
   a query rewriter configured to intercept a query regarding a database row and to rewrite the query to log an activity of the database row;
   an activity store configured to store the logged activity of the database row;
   an activity monitor configured to monitor the activity of the database row and to determine a target database for the database row depending on the activity;
   a relationship tracker configured to identify any related database row; and
   an archive manager configured to move the database row and any related database row to the target database while maintaining referential integrity between the database row and any related database row,
   wherein the activity comprises all accesses of the database row, and the archive manager moves the database row and any related database row to the target database includes one of archiving the database row and any related database row to a lower priority database or retrieving the database row and any related database row to a higher priority database.

26. The system for managing data as recited in claim 25, wherein the relationship tracker determines a referential integrity relationship between the database row and any related database row.

27. The system for managing data as recited in claim 25, wherein the activity monitor determines whether the database row and any related database row is moved to a high priority database or a low priority database.

* * * * *